(12) United States Patent
Kuzmier

(10) Patent No.: US 7,874,245 B2
(45) Date of Patent: Jan. 25, 2011

(54) COUNTERTOP FRESH FRUIT AND VEGETABLE PRESERVATION DEVICE

(76) Inventor: John Spencer Kuzmier, 2801 Turner Grove Dr. North, Greensboro, NC (US) 27455

( * ) Notice: Subject to any disclaimer, the term of this patent is extended or adjusted under 35 U.S.C. 154(b) by 805 days.

(21) Appl. No.: 11/638,377

(22) Filed: Dec. 14, 2006

(65) Prior Publication Data

US 2007/0141210 A1 Jun. 21, 2007

Related U.S. Application Data

(60) Provisional application No. 60/750,821, filed on Dec. 16, 2005.

(51) Int. Cl.
*A23B 7/152* (2006.01)
*B65D 81/18* (2006.01)
(52) U.S. Cl. .............................. 99/474; 99/468; 99/476
(58) Field of Classification Search ........... 99/467–476, 99/485–489, 516, 483, 330; 141/65; 422/121, 422/292, 28, 29, 37, 189–190; 62/56, 78, 62/132, 252, 331, 441, 335, 272; 165/185, 165/186; 426/321–326, 118, 395; 312/116, 312/236
See application file for complete search history.

(56) References Cited

U.S. PATENT DOCUMENTS

| | | | |
|---|---|---|---|
| 1,215,254 A | | 2/1917 | Darden |
| 2,339,507 A | | 1/1944 | Nagy et al. |
| 3,521,459 A | * | 7/1970 | Rath .............................. 62/78 |
| 4,222,276 A | | 9/1980 | DeRogatis |
| 4,857,277 A | * | 8/1989 | Broomfield ............ 422/186.07 |
| 4,984,611 A | * | 1/1991 | Takatsuki et al. ............. 141/65 |
| 5,195,427 A | * | 3/1993 | Germano ..................... 99/472 |
| 5,394,789 A | * | 3/1995 | Evans et al. ................... 99/345 |
| 5,431,939 A | * | 7/1995 | Cox et al. .................... 426/300 |
| 5,570,628 A | * | 11/1996 | Kiener et al. ................. 99/472 |
| 5,783,242 A | | 7/1998 | Teague |
| 5,806,575 A | * | 9/1998 | Tsay ............................ 141/65 |
| 6,045,844 A | | 4/2000 | Song et al. |
| 6,162,477 A | | 12/2000 | Crisinel et al. |

(Continued)

FOREIGN PATENT DOCUMENTS

DE        3421333 A1 *  3/1985

(Continued)

OTHER PUBLICATIONS

Decker, "A Novel Method for Consuming Oxygen Instantaneously in Photopolymerizable Films", Makromol. Chem. 180:2027-2030 (Dec. 1979).*

*Primary Examiner*—Geoffrey S Evans
(74) *Attorney, Agent, or Firm*—Welsh, Flaxman & Gitler LLC

(57) ABSTRACT

A container for perishable food items, such as fruits and vegetables is provided with a device for producing a substance for killing the fungus or bacteria said substance adhering to the surface of the food item. This substance produced by a device for generating ozone or an oxygen atom and is directly provided in or attached to the food container. A retractable hood can be utilized to prevent the substance from entering the atmosphere of a room prior to the completion of a treatment. A fan is provided for assisting in the introduction as well as the elimination of the substance to and from the interior of the container.

10 Claims, 3 Drawing Sheets

U.S. PATENT DOCUMENTS

| | | | |
|---|---|---|---|
| 6,200,618 B1 | 3/2001 | Smith et al. | |
| 6,485,769 B2 | 11/2002 | Audy et al. | |
| 7,040,356 B2 * | 5/2006 | Tarlow | 141/65 |
| 7,325,409 B2 * | 2/2008 | Espinosa | 62/78 |
| 2003/0059506 A1 | 3/2003 | Johnson | |
| 2003/0152673 A1 * | 8/2003 | Tarlow | 426/118 |
| 2004/0096354 A1 | 5/2004 | Nomura et al. | |
| 2004/0131518 A1 | 7/2004 | Santibanez et al. | |
| 2004/0185156 A1 * | 9/2004 | Garwood | 426/398 |
| 2004/0194496 A1 | 10/2004 | Gleason et al. | |
| 2005/0011372 A1 * | 1/2005 | Corrigan et al. | 99/468 |
| 2005/0042337 A1 * | 2/2005 | Tarlow | 426/106 |
| 2005/0085577 A1 * | 4/2005 | Ching et al. | 524/394 |
| 2006/0257498 A1 * | 11/2006 | Stingl et al. | 424/616 |
| 2008/0060376 A1 * | 3/2008 | Espinosa et al. | 62/331 |
| 2008/0118395 A1 * | 5/2008 | Benedek | 422/4 |
| 2008/0230143 A1 * | 9/2008 | Swanson | 141/65 |

FOREIGN PATENT DOCUMENTS

| | | | |
|---|---|---|---|
| JP | 1-70376 A | * | 3/1989 |
| JP | 3-113264 A | * | 5/1991 |
| JP | 10-271950 A | * | 10/1998 |
| JP | 11-276065 A | * | 10/1999 |
| WO | WO-2005/011846 A1 | * | 2/2005 |

* cited by examiner

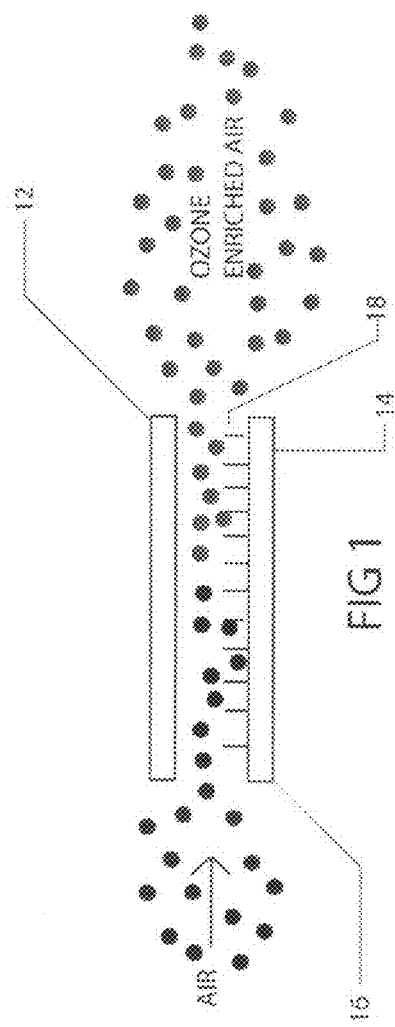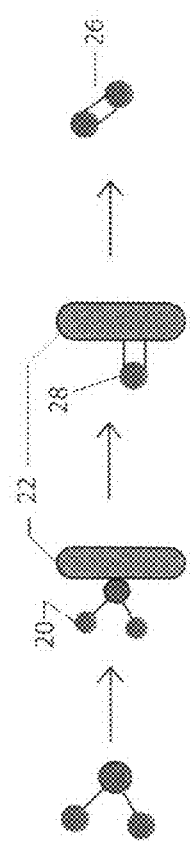

COUNTERTOP FRESH FRUIT AND VEGETABLE PRESERVATION DEVICE

CROSS-REFERENCE TO RELATED APPLICATION

This application claims the benefit of U.S. provisional patent application Ser. No. 60/750,821, filed Dec. 16, 2005, the entire contents of which are incorporated herein by reference.

FIELD OF THE INVENTION

The present invention relates to a method and apparatus for treating perishable food items, such as fruits and vegetables, for the purpose of extending the shelf life of these products.

BACKGROUND OF THE INVENTION

The consumption of fresh fruits and vegetables is a critical portion of a balanced diet. However, due to the potential for contamination by pathogens, consumption of raw or minimally processed fresh fruit and vegetables may pose a real danger to consumers, especially young children or others having a weakened immune system. Therefore, the development of further processing techniques to reduce the risk of consuming contaminate fruits and vegetables is paramount to the increased consumption of fresh fruits and vegetables by people of all ages.

Furthermore, fresh fruit and vegetables can easily be subject to spoilage, particularly when the fruits and vegetables are not stored in a cold environment, such as a refrigerator, but kept at room temperature.

Modified atmosphere packaging (MAP) and controlled storage (CA) are often used to alter the gaseous environment of a stored fruit or vegetable resulting in an extension of shelf life due to their effectiveness of destroying food pathogens. These techniques modify the atmosphere surrounding the fruit and vegetables by changing the ratio of oxygen and carbon dioxide resulting in the alteration or disruption of the cell membranes of the microorganisms, such as pathogens. The drawback to the extensive use and application of MAP and CA is that while they may destroy certain microorganisms, and therefor inhibit spoilage, they would allow such pathogens such as *Clostridium perfringens, Clostridium botulinum* and *Lysteria monocytogenes* to still survive, thereby resulting in a false sense of security to unsuspecting consumers.

Various substances, such as ozone or singlet oxygen has been shown to have similar antimicrobial effects to that of MAP, CA as well as common chemical disinfectants, such as chlorine and chlorine dioxide. Ozone may be an effective alternative to sanitizers for fruits and vegetables since that it acts as a progressive oxidizer of cellular components, such as polyunsaturated fatty acids, amino acids and protein. The degradation of the cellular envelope of a microorganism results in destruction and leakage of cell components, and subsequent deaths of several of types of food-borne pathogens. Excessive application of ozone, however, may result in surface discoloration of fruits and vegetables such as peaches, carrots and broccoli florets. More recent studies of the application of ozone to table grapes have shown that it is not only effective in controlling post-harvest decay caused by fungi, but was also effective in eliciting an increase in the phytoalexins Reszeratrol and pterostilbnes. These findings on the effectiveness of ozone are significant in that they show the potential of this technique to increase the levels of very powerful antioxidants, both of which have been demonstrated to be effective in reducing several risk factors associated with degenerative diseases such as cancer, cardiovascular diseases, arthritis and other inflammatory diseases.

Substituting fresh fruit for processed fruit is frequently cited to reduce cancer, heart disease and excess weight. The U.S. Department of Agriculture estimated in 2004 that Americans eat only half the fresh fruit that is needed. Despite having gained the knowledge that increasing fresh fruit consumption is beneficial, making this diet change has proven to be difficult for most people. This is in part caused by the higher cost of fresh fruit and vegetables relative to heavily processed food, so that people are inclined to purchase less fruit and vegetables and eat them sparingly. The shelf life for fresh fruits and vegetables is substantially shorter than that of processed foods. It is estimated that between 20% and 30% of all food spoils before it is consumed. Additionally, over-ripened fruit often serves as a breeding ground for fruit flies. These fruit flies are hard to eliminate without removing all fruit from the home for several days, thereby annoying consumers.

Many consumers turn to refrigeration in order to extend the life of their fruit and vegetables. Unfortunately, refrigeration takes the fruit out of sight so consumers tend to forget about it, and fail to eat it, and thereby lose the benefits of eating fruit. An additional drawback to refrigeration is that when many fruits are eaten cold, they lose a significant amount of taste as well as their appeal.

Several U.S. patents have issued which are directed to various systems for increasing the shelf life of food, using ozone or a similar substance. For example, U.S. Pat. No. 1,215,254, to Darden describes a device for preserving organic substances, such as fruit, vegetables, meats and the like. These materials would be provided within containers or cells having an ozonizer equipped to charge the air within the containers or cells with as much as 5% ozone. However, it is noted that the system described in the Darden patent is used in conjunction with a cold container or cell and would not be easily converted to a product used in an individual's home.

U.S. Pat. No. 6,485,769, issued to Audi et al describes a method and apparatus for decreasing the bacteria count of a food commodity by subjecting the food commodity contained in a sealed container with ozone produced from an ozone generator. A fluid stream generated by the ozone generator would include approximately 1% to 20% of ozone when oxygen or air is fed to the ozone generator. It is noted that this patent does not specifically indicate that the food included in the sealed container would be fruit. More importantly, as indicated in the Field of the Invention, the patent to Audi et al is directed to a method for reducing pathogenic microorganism population on food commodities during food processing, and not after the food has been delivered to a person's home.

Similarly, U.S. Pat. No. 6,162,477, issued to Crisinel et al discusses a process and apparatus for treating food products prior to the food products being introduced to the individual's home. An oxygen-containing gas mixture would feed an ozonizer utilized to contact the food product for the purpose of sanitizing and deodorizing the food product.

U.S. Pat. No. 6,200,618, issued to Smith et al describes a method for reducing the microbial population of a food in a container. An ozone injector is used to inject ozone, along with water to an application zone in which the food is provided. The ozonated wash liquid is used to contact the food for a period of time preferably between 5 to 15 minutes, thereby disinfecting the surface of the food. However, as previously indicated, water must be injected into the container along with the ozone, thereby making it more difficult to use in a home environment.

SUMMARY OF THE INVENTION

The deficiencies of the prior art are overcome by the method and apparatus of the present invention as will be described. Fungus or mold that originates on the surface skin of fruit is a primary cause of fruit spoilage. Although the present invention can be utilized to prevent spoilage in both fruit and vegetables, henceforth, for the sake of simplicity, we will describe the present invention as directed to the preservation of fruit.

The present invention would prevent and destroy mold on the fruit while simultaneously leaving the fruit in plain view, such as on a countertop. The present invention would more than double the life of the fruit provided at room temperature, such as provided on a countertop. Prolonging the useful life of the fruit would be beneficial for many reasons. Firstly, the induction of fruit spoilage which is a direct result of the decreased microbial population in the vicinity of the fruit would double or triple the fruit shelf life. Furthermore, fresh fruit can be displayed on the countertop at room temperature, thereby increasing the attractiveness of the fruit and increasing the likelihood that the fruit would be eaten. The present invention would also improve the taste and visual appeal of the fruit by preserving the fruit at room temperature and humidity. The present invention would eliminate fruit flies without the necessity of subjecting the environment to harmful chemicals, thereby removing the necessity of the periodic purging of all household fruit flies. Additionally, inorganic compounds on the fruit's surface would be oxidized. Neutralized/oxidized compounds may include pesticides residing on the fruit's surface. All of the benefits of the present invention would be accomplished without the use of pesticides, harmful chemicals or water.

The benefits of the present invention are accomplished by incorporating a device for producing the sanitizing substance directly into or provided above a portion of the container, thereby storing and displaying the fruit in plain view. Alternatively, the device for producing the sanitizing substance could be housed in the cavity of the container containing the fruit or vegetables to be protected. Substances such as, but not limited to ozone or singlet oxygen, would be directed into the interior of the container, allowing the substance to adhere to the skin of the fruit or vegetables, thereby destroying a pathogen, such as fungus or bacteria, thereby increasing the shelf life of fruit.

A retractable hood or lid can be applied over the container during the treatment process, and then removed after the ozone has been eliminated from the interior of the container.

It is envisioned that one or two treatment times of between 20 and 30 minutes would be needed every 24 hours to extend the shelf life of the fruits and vegetables. A timer would be used to initiate production of the treatment substance, which would be removed from the interior of the container, particularly if a hood was employed to close the container during the treatment process.

BRIEF DESCRIPTION OF THE DRAWINGS

The above and other objects, features, aspects and advantages of the present invention will become more apparent from the following detailed description of the present invention when taken in conjunction with the accompanying drawings.

FIG. 1 is a diagram showing the production of ozone used in a first embodiment of the present invention;

FIG. 2 is a drawing showing the ozone of FIG. 1 adhering to the outer surface of a substance;

DETAILED DESCRIPTION OF THE PREFERRED EMBODIMENT

Figure 3:
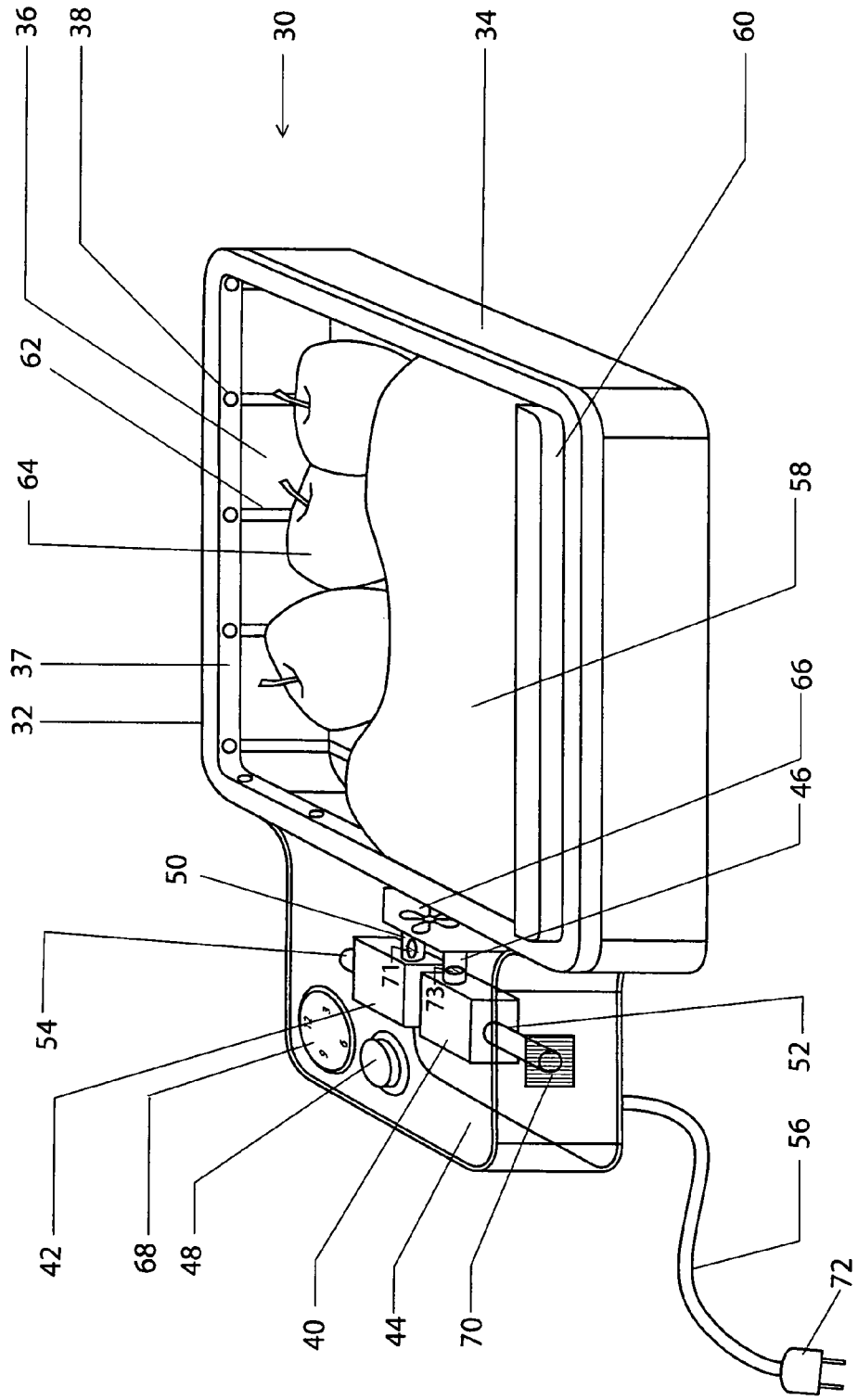
FIG. 3 is a perspective drawing of the first embodiment of the present invention.

The present invention operates, in a first embodiment, by coating the outer skin of fruits with a substance, such as ozone, having an antimicrobial effect. FIGS. 1 and 2 show a rudimentary system of how ozone can be easily and economically produced. The system 10 of the present invention includes a device creating a corona discharge having a positive electrode 12 and a negative electrode 14. Air enters the corona discharge device at one end 16 and flows between a positive electrode 12 and the negative electrode 14, exiting the device at end 18 as a combination of air as well as ozone. The high voltage between the electrodes would produce ozone from the oxygen molecules in the air. Although only one positive and one negative electrode are illustrated, it is noted that a plurality of positive and negative electrodes may be employed. It is also noted that ozone can be produced by using high energy photons such as ultraviolet light. It is envisioned that any method of producing ozone would be covered by the present invention.

As illustrated with respect to FIG. 2, the ozone molecule $O_3$ 20 would dock with an organism detrimental to the preservation of fruits or vegetables, for example, a fungus or microbe 22 adhering to the surface of the fruit. The ozone molecule contains an extra electron, thereby producing a negative charge which would be attracted to the fruit containing a positive charge produced by the use of a grounding mesh in physical contact with the fruit and a container in which the fruit is stored. Due to its unstable nature, the ozone molecule 20 after it docks with the fungus or microbe 22 would revert to an $O_2$ molecule 26 with a single oxygen atom 24 still adhering to the surface of the fungus or microbe 22. The O atom 24 would act to degrade the cellular envelope of the fungus or microbe 22, resulting in disruption and leakage of the cell components, and the subsequent death of the foodborne fungus, microbe or pathogen.

A second embodiment is designed to produce a singlet O atom without the necessity of initially producing the ozone molecule. One method of accomplishing the production of the singlet O would be to shine a light onto a photosensitizing agent, such as, but not limited to, Methylene blue. When light is directed toward Methylene blue, the $O_2$ molecule in air is split into a plurality of singlets oxygen (O) atoms which would adhere to the surface of the fungus, microbe or pathogen as shown with respect to FIG. 2.

FIG. 3 illustrates a first embodiment 30 of the present invention employing an ozone generator as the sanitizing agent. A container 34 would be utilized to both house the fruits 64 therein as well as to include all of the components necessary to produce the ozone as well as to evacuate and neutralize the ozone after the fruit 64 has been subjected to the ozone treatment. The container 34 would generally be in the form of an open bowl constructed from many types of material, such as ceramic, plastic or metal. Although the bowl can be constructed from any sort of moldable material, it can be preferably formed to create the impression of stainless steel. Alternatively, the interior of the container 34 could have two pairs or sides, forming a cavity therebetween. Furthermore, while the exact size of the bowl is not important, the present invention could utilize a bowl having an inside diameter of 13 inches, approximately 1,000 cubic inches, allowing a significant amount of fruit 64 to be stored and displayed in the container 34.

The container 34 would be constructed having an outer shell 32 as well as an inner shell 36 having a conduit 37 therebetween, the purpose of which will be explained. The container 34 will be provided with an enlarged portion, such as a lip 44 housing a number of the components used to produce the ozone, as well as to force the ozone into the container and filter the ozone after the treatment. Alternatively, these components could be provided on top of the lip 44. It is noted that these components could also be housed between the outer shell 32 and the inner shell 36 or in the base of the container. The lip 44 is provided with an ozone generator 40 utilizing a "corona" effect as described in FIG. 1. Air, at room temperature, would be introduced into the ozone generator 40 through an intake 70 and a conduit 52. Although not mandatory to be used during the treatment period, a hood 58 would move from a retracted position within a cavity 60 of the container 34 to a position completely covering the interior of the container 34. For ease of explanation, FIG. 3 shows only a portion of the retractable hood 58.

When the retractable hood 58 is in position, air at room temperature would flow into the intake 70 with the assistance of a circulation/exhaust fan 66, enabling the room air to flow through the conduit 52 into the ozone generator 40. The ozone produced by the ozone generator 40 would flow, with the assistance of the fan 66 through a conduit 46 and into the conduit 37 provided around all, or a portion of the interior of the container 34. A plurality of apertures 38 provided on the surface of the conduit 37 would allow enriched air, including the ozone produced by the ozone generator 40 to be introduced into the interior of the container 34. The ozone molecule would then initially adhere to the skin of the fruit 64 in the manner shown in FIG. 2 to kill any fungus or other pathogens. Subsequently, the ozone molecule would decompose into $0_2$ molecules leaving the surfaces of the fruit, with an oxygen (O) atom still adhering to the surface of the fruit. Alternatively, dependent upon placement of the generator with respect to the cavity for storing the food products gravity or thermal currents could also be used to introduce the sanitizing substance into the interior of the container.

Once the ozone has been produced and the enriched air is introduced into the interior of the container 34 for a predetermined period of time, it is important that the ozone still remaining in the interior of the container 34 be neutralized and filtered. With the retractable hood 58 still in place covering the interior of the container 34, the fan 66 would reverse its flow, thereby sucking the enriched air within the interior of the container 34, including the ozone through the apertures 38 and back into the conduit 37. The enriched air mixture would flow through a conduit 50 in fluid connection with a catalyst filter, such as manganese oxide or manganese dioxide for the purpose of converting ozone to oxygen. Air would then exit from the lip 44 of the container 34 through a conduit 54 in fluid communication with an outlet in the side or top of the lip, not shown. When the enriched air has been neutralized, the hood 58 would retract into the cavity 60 provided between the outer shell 32 and the inner shell 36 of the container 34. A grounding plate in the form of a plurality of ridges 62 is provided within the interior of the container 34 on which the fruit 64 would rest. The purpose of the grounding plate is to increase the attraction of the ozone molecules to the electrically grounded fruit. This would operate in the manner described since the ozone has an extra electron exhibiting a negative charge and the ridges 62 would ground the fruit with a positive charge. The ridges 62 would completely extend from one side of the container to the other side or would extend partially between two sides of the container. The ridges would be in connection with the source of electrical power.

The ozone is produced one or more treatment periods during a 24 hour period, with each treatment period being for a limited, defined period of time. Although a continual treatment could work, due to the corrosive effects of the ozone, it would be more beneficial to limit the treatment time and, also, to treat the fruit with the hood 58 provided in the closed position. At the present time, a range of approximately three parts per million to twenty parts per million would be preferable, but not mandatory. When used for a limited period of time, a treatment time of 20 to 30 minutes can be utilized. During this treatment time, the ozone is produced utilizing the ozone generator 40 with the created enriched air flowing into the interior of the container 34 with the assistance of the fan 66. At a predetermined time during this treatment period, the production of ozone would cease, and after a predetermined period of time, the reversible fan 66 would operate to suck the enriched air including ozone through the neutralizing catalyst and out into the atmosphere. At this time, the hood 58 would then be retracted. It is noted that while manganese oxide or manganese dioxide, have been found to adequately neutralize the ozone molecule into a standard oxygen molecule, the specific type of the catalyst is not important. Furthermore, the catalyst 42 as well as the reversible fan 66 and the ozone generator can be provided in one or more cartridges which can be easily replaced.

The ozone generator 40 would generate ozone from room air very easily and economically. For example, the ozone generator would draw only four watts of power equating to approximately $3.00 per year at 0.0832 cents per kilowatts hour. The present invention is designed to operate with connection from a 110 volt power cord 56 with a plug 72 connected to a standard electrical outlet. Alternatively, the present invention could be operated utilizing one or more rechargeable or non-chargeable batteries.

An ON/OFF switch 48 would be used to indicate the operation of the ozone generator 40 and the fan 66. A timer 68 could also be utilized in the present invention. The timer would be set to indicate the exact time or times that the unit would operate during a 24 hour day. Additionally, the timer could be set to input the exact duration of each treatment period. Therefore, once the ON/OFF switch 48 is engaged, the treatment unit would automatically operate. At the appropriate time, the retractable hood 58 would move from the retracted position within cavity 60 to a position covering the interior of the container 34. Once the interior is covered, the fan 66 would operate to force air through inlet 70 into the ozone generator 40, thereby producing ozone which would be introduced into the interior of the container 34 through conduits 46 and 37. At this point, the ozone would adhere to the surface of the fruit as shown in FIG. 2 thereby killing the fungus or bacteria or other pathogen. At the appropriate time, the ozone generator would cease to operate in the circulation direction. The fan 66 could remain idle for a period of time or would immediately reverse its cycle, sucking the enriched air including ozone into the apertures 38, thereby directing the enriched air including ozone into conduit 37. The enriched air including the ozone would pass through conduit 50 into the neutralizing catalyst 42, converting the ozone molecule back to the $O_2$ molecule which would be directed into the atmosphere through an outlet (not shown). Once the ozone has been neutralized, the hood 58 would retract back into the cavity 60 of the container 34.

Various devices, such as flap valve 71 in conduit 50 and flap valve 73 in conduit 46 would be used to properly direct the enriched air into the interior of the container 34 without the enriched air passing through the conduit 50 and into the catalyst 42. During the initial portion of the treatment cycle when the ozone is produced, flap valve 73 would be in the opened position and flap valve 71 would be in the closed position allowing the enriched air to flow through conduit 46 into conduit 37 and not into conduit 50. During the exhaust cycle, the position of the valve would be reversed, with flap valve 73 closed and flap valve 71 opened, ensuring that the enriched hair would re-enter conduit 37 through aperture 38 and flow through conduit 50 and into the catalyst 42, without flowing into the ozone generator 40.

The appropriate opening and closing cycle of the flap valves 71 and 73 would be accomplished by the difference in air pressure through the operation of the fan 66, or could be opened and closed electrically under supervision of a microprocessor included in the container to control the operation of the present invention.

It is noted that the entire invention would be operated by an appropriate control unit including a microprocessor which would control the aforementioned cycle by sequentially operating the hood 58, the ozone generator 40 as well as the fan 66. The hood can be constructed from a plastic material to be housed between the outer shell 32 and the inner shell 36. Alternatively, the hood 58 could be constructed from a fabric-type material. In this embodiment, a small reel may be provided between the outer shell 32 and the inner shell 36 onto which the hood 58 would be stored.

Figure 4:
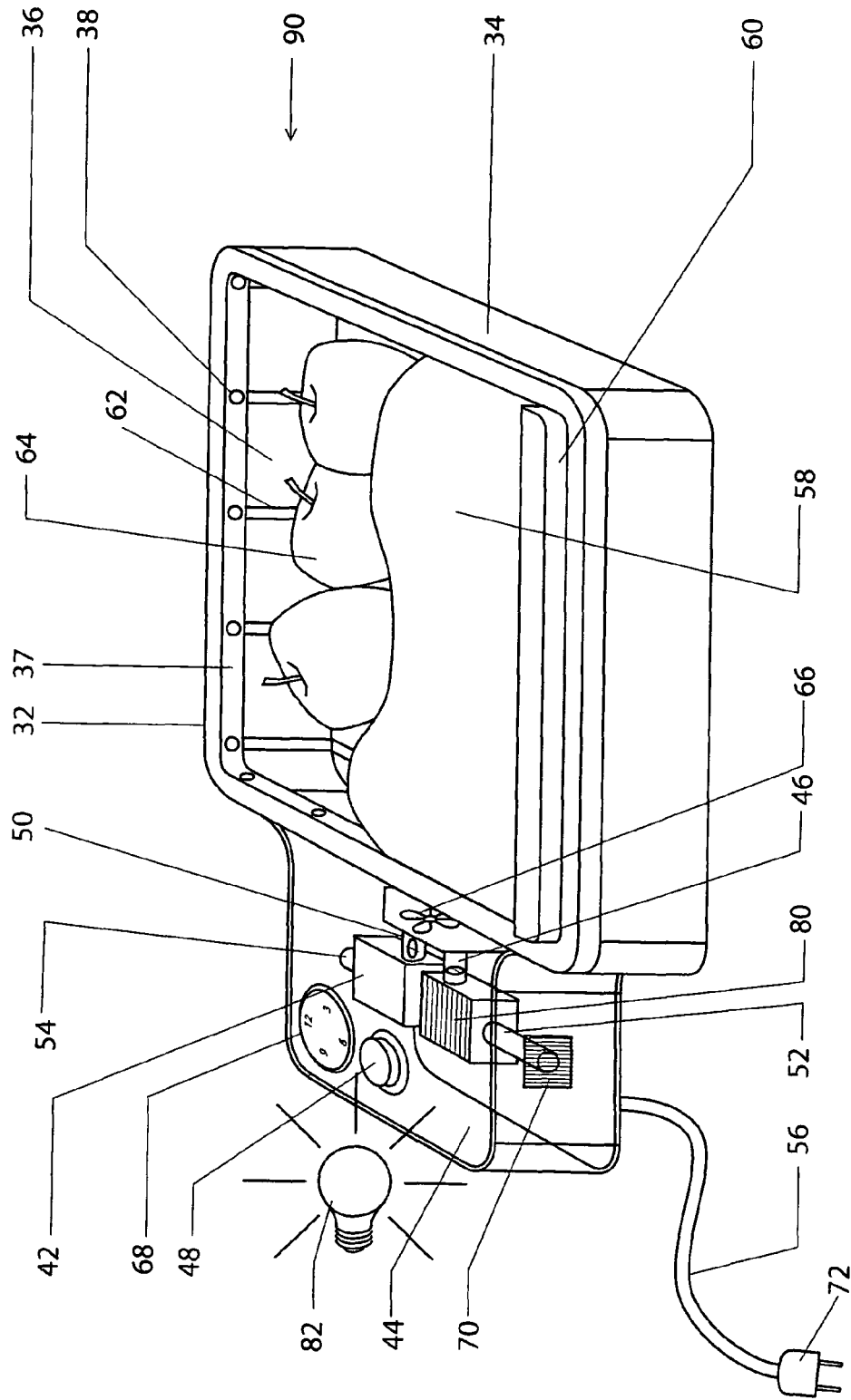
FIG. 4 is a perspective view of a second embodiment of the present invention.

FIG. 4 illustrates a second embodiment 90 of the present invention which does not utilize an ozone generator. As previously discussed, and as illustrated with respect to FIG. 2, the adherence of a single oxygen atom to the fungus or bacteria is sufficient to kill the fungus or bacteria. Consequently, FIG. 4 utilizes a technology for producing a single atom of oxygen. In this embodiment, focusing a light source 82 onto a photosensitizing agent such as, but not limited to Methylene blue, would create the single oxygen atom which would adhere to the surface of the fruit. Similar to the embodiment shown in FIG. 3, the treatment may be conducted with the hood 58 in place, or with the hood 58 contracted into the cavity 60. The singlet oxygen atoms included in an enriched air mixture would travel from conduit 46 into conduit 37 and then would be introduced to the interior of the container 34 through the apertures 38. After a predetermined period of time, the fan 66 would act to exhaust a substantial amount of the gases within the container 34 through the apertures 38, conduit 37 as well as conduit 50, and then out to the atmosphere through conduit 54. Since ozone is not being introduced into the interior of the container 34, the use of a catalyst 54 is not crucial to the invention. Similar to the embodiment shown in FIG. 3, Methylene blue can be contained in a cartridge 80 which can be replaceable, as can the fan 66 and the catalyst 54.

Although the present invention has been described in detail, it is clearly understood that the same is by way of illustration and example only and is not to be taken by way of limitation, spirit and scope of the present invention being limited only by the terms of the appended claims. For example, although the present invention has been described with the utilization of a hood retractable into the container, the invention can operate without any hood, or by physically affixing the hood to the container prior to the treatment cycle, and removing the hood from the container, after completion of the treatment cycle. Furthermore, the invention can be operated in a manual mode, without the necessity of a timer. In the manual mode, a user would merely engage the ON/OFF switch for a period of time, with or without the hood covering the container.

What is claimed is:

1. A device used to preserve perishable food items, comprising:
   a container having a first cavity for the placement of the food items therein, said container provided with a perimeter;
   a generator provided within a second cavity in communication with said first cavity for producing ozone during a treatment period used to extend shelf life of the food items, said ozone flowing from said second cavity into said first cavity, said ozone adhering to a surface of an organism detrimental to preservation of the food items for a period of time during said treatment period, said organism itself adhering to the surface of the food items;
   a fan for directing said ozone into said first cavity;
   a first conduit having a plurality of apertures therein, said first conduit extending around at least a portion of the interior surface of said first cavity, allowing said ozone to flow from said generator provided in said second cavity through said first conduit and into said first cavity with said fan operating in a first mode; and
   a neutralizing catalyst provided within said second cavity for converting said ozone to an oxygen molecule during a portion of said treatment period, and further wherein said ozone flows from said first cavity into and through said first conduit entering said second cavity, wherein said ozone is neutralized by said neutralizing catalyst.

2. The device in accordance with claim 1, further comprising a second conduit situated between said generator and said first conduit.

3. The device in accordance with claim 1, wherein said generator comprises at least one positively charged electrode and at least one negatively charged electrode.

4. The device in accordance with claim 1, wherein said neutralizing catalyst is manganese oxide or manganese dioxide.

5. The device in accordance with claim 1, further including a third conduit between said neutralizing catalyst and said first conduit.

6. The device in accordance with claim 5, further including a first valve provided in said second conduit and a second valve provided in said third conduit, said first valve provided in an opened position and said second valve provided in a closed position when said fan is operating in said first mode, and further when said fan is operating in said second mode, said first valve is provided in a closed position and said second valve is provided in an opened position.

7. The device in accordance with claim 1, further including a timer provided on said container for setting the operating time and duration of said treatment period.

8. The device in accordance with claim 1, said perimeter including a lip portion housing said generator.

9. The device in accordance with claim 8, wherein said fan and said neutralizing catalyst are provided in said lip portion.

10. The device in claim 1, wherein said first cavity is subjected to ambient air pressure during the operation of the device.

* * * * *